Aug. 11, 1931.  C. A. GRATIOT  1,818,220
LAWN MOWER
Filed May 6, 1930  2 Sheets-Sheet 1
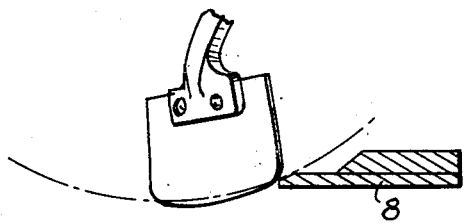
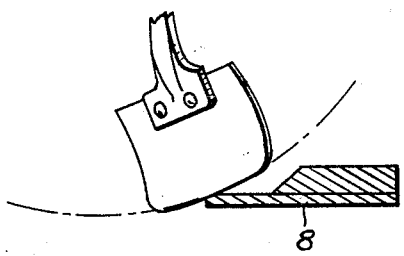
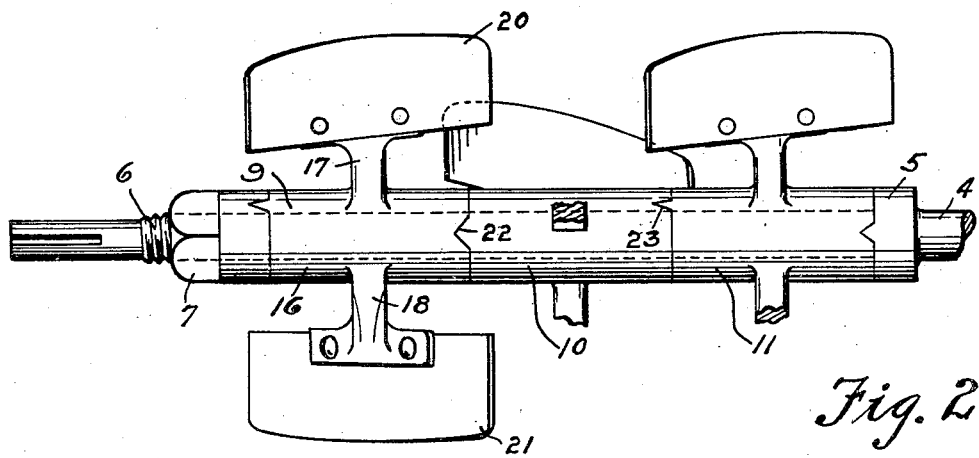
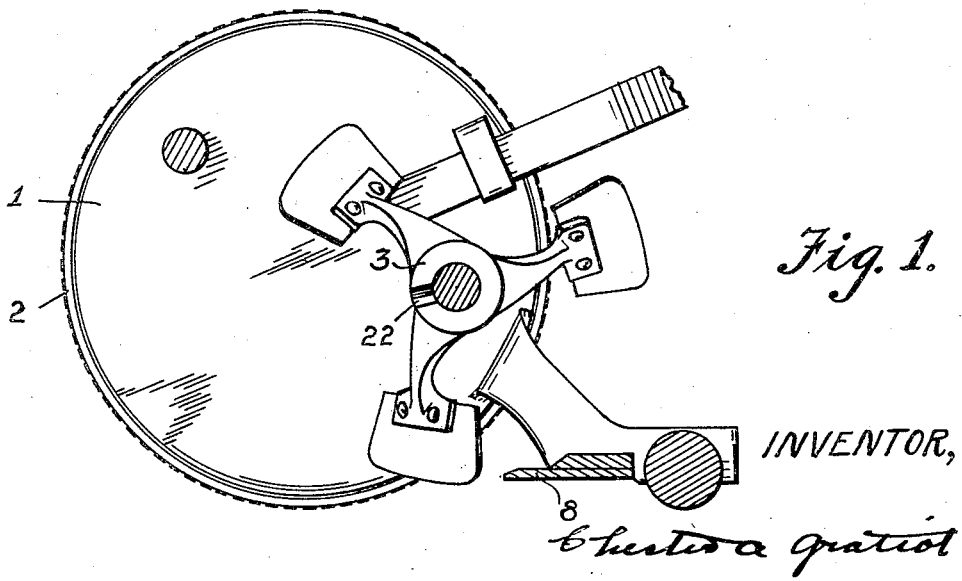
INVENTOR,
Chester A. Gratiot Aug. 11, 1931.   C. A. GRATIOT   1,818,220
LAWN MOWER
Filed May 6, 1930   2 Sheets-Sheet 2

INVENTOR,
C. Gustava Gratiot

Patented Aug. 11, 1931

1,818,220

UNITED STATES PATENT OFFICE

CHESTER A. GRATIOT, OF PORTLAND, OREGON, ASSIGNOR TO EVERSHARP LAWN MOWER COMPANY, OF RENO, NEVADA, A CORPORATION

LAWN MOWER

Application filed May 6, 1930. Serial No. 450,124.

My invention relates to improvements in means for insuring the efficient cutting contacts with a stationary knife of revolving blades, and to means constituting an elastic gear between the driving mechanism and the cutting edges of said revolving blades.

The principal object of my invention is the provision for a less critical relationship of the axis about which said cutting edges revolve with respect to the said stationary knife.

A second and incidental object of my invention is the provision for enhanced durability of the adjustment of the relationship of said revolving and stationary knives.

A third object is the elimination of objectionable strains on the driving gear for said revolving cutting edges.

A fourth object is to provide an augmented degree of stability of the cutterhead shaft.

A fifth object is the provision of a method of assembly of the cutterhead which insures uniformity of certain relationships of the revolving knives; the means employed affording, incidentally, certain facilities in manufacture believed to be valuable.

These objects are accomplished by a combination of opposing strains especially calculated therefor with particular and novel regard for the dynamic strains imposed upon the supporting members and driving mechanism by the intermittent loading thereof incident to the intermittent contacting of the cutting edges with said stationary knife.

Other objects and advantages of my invention are apparent in the following discourse wherein the significance of the reference numerals in the accompanying drawings, details of construction and operation of a typical lawn mower embodying the invention, and its particular utility are explained.

Figure 1 represents a view of a medial section of the lawn mower head normal to the axis of rotation of the cutter head thereof.

Figure 2 represents a view of a fragmentary assembly of the cutterhead lying in a plane parallel to its axis of rotation.

Figure 3 represents a typical cutterhead knife and the stationary knife of the lawn mower in normal relationship at the instant before contact of the two occurs.

Figure 4 represents the same knife and stationary blade in normal relationship at the instant when the middle portion of the curved cutting edge of the blade is in contact with the stationary knife.

Figures 5, 9:
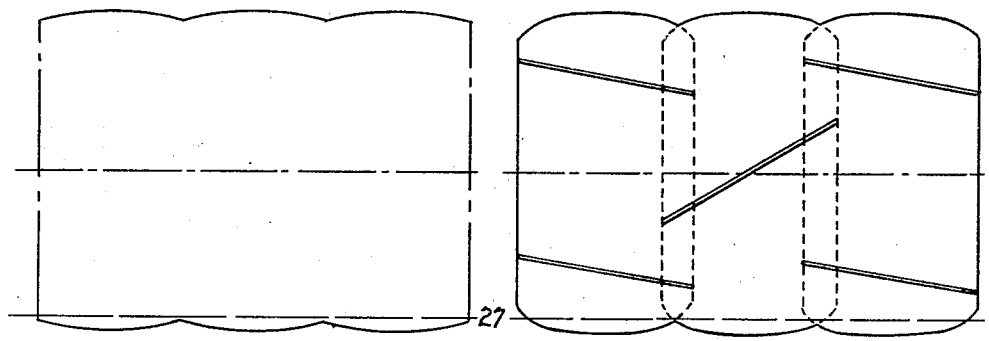
Figure 5 is a diagram representative of the profile of the paths of the cutting edges of the revolving blades when free of the stationary knife, and the relationship thereof to the cutting edge of the stationary knife.
Figure 9 is a diagram representing the relationship with the paths of the revolving cutting edges of a blade typical of those upon which said revolving cutting edges are formed and the intersection therewith of the plane in which it lies, and as well the relationship thereto, in an important aspect, of the stationary knife.

The reference numeral 1 indicates one of the lateral frames of the lawn mower typical of two thereof symmetrically formed constituting the members upon each of which is journaled a traction wheel as 2, and which contain journals for the revolving cutterhead 3, and as well form the housing for the internal gearing between said traction wheels and said cutterhead, and places of attachment of a horizontally disposed stationary blade 8; all in the usual manner well known in the art.

The revolving cutterhead represented in Fig. 2 is composed of a shaft 4 formed with an annular projection 5 and a thread 6 at its opposite end upon which a clamping nut 7 is screwed to engage in compression the series of knife carriers 9, 10, and 11 to secure them in rigid relationship to each other and to the shaft 4.

The knife carriers are of two symmetrical and complementary forms each comprising a hub 16, several radial arms as 17 and 18 to which the cutterhead knives as 20 and 21 are secured, and a nog 22 adapted to engage in the adjacent knife carrier hub a female counterpart, or notch 23, separated angularly with respect to that view represented in Figure 1, to provide for the disposition of the revolving knives on each carrier intermediately of those carried upon the adjacent knife carrier.

Attached to each knife carrier arm is a flexible, flat knife secured thereupon parallel to a plane inclined to that plane in which the axis of the shaft 4 lies. Thus the knives may be collectively grouped upon their respective carriers, and as a whole, so that all of the knives on any carrier considered shall be individually disposed parallel to a series of planes respectively, which if produced would intersect each other on lines intersecting at a common point, contained in the axis of the cutterhead, coincident with that plane normal thereto disposed centrally of the axial extent of these knives, and so that each group of knives on each carrier of the whole cutterhead assembly shall be aligned with reference to planes oppositely inclined to those planes with reference to which the knives of the adjacent carriers are aligned.

Or, the individual knives on each carrier may be fixedly disposed upon the several arms of such carrier, parallel to a series of planes, which if produced would intersect on lines passing through a small circle in that plane normal to the axis of the cutterhead disposed centrally of the axial extent of the knives.

Figure 8:
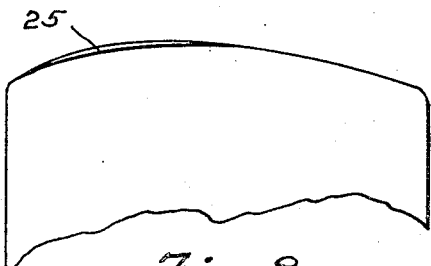
Figure 8 represents a fragment of a typical cutterhead knife particularly illustrating the varying bevel thereon maintained by the wearing away of the knife metal by frictional contact with the stationary knife to form the cutting edge.

Each cutterhead knife is of one of two symmetrical figures characterized in particular by the nature of that surface thereof which makes contact with the stationary blade of the mower. This surface, indicated at 25 in Figure 8, is approximately a portion of a conic surface delineated by the intersection with a cone of two oblique parallel planes between which is contained a conic frustrum that would contain the figure of the cutterhead knife. This surface is further peculiarized by its asymmetric character.

Figure 10:
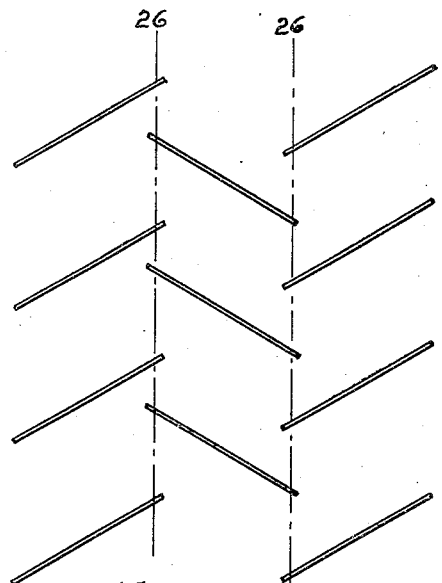
Figure 10 is a cylindrical projection of the contacting edges of the cutterhead knives illustrative of one manner of arrangement to provide for the overlapping of the contacting edges of the cutterhead knives.

The relationship of such a cone in whose oblique frustrum a cutter-head knife would be contained, to those cones similarly related to other knives in the cutterhead and to the axis thereof, and a special aspect of the peculiar relationship of these conic contacting surfaces of the several knives, are as follows:

The apices of such cones would point in alternate directions, while the axially adjacent, asymmetric, conic, contacting surfaces would in a cylindrical projection Figure 10, be symmetrically disposed about the lines 26 in this figure.

A further peculiarity in the combination of all of the cutter-head knives about their respective knife-carriers as secured to the shaft 4 is that the profile of the paths of the cutting edges of these flexible blades when free of the stationary knife of the mower is of the form illustrated in Figure 5 and is characterized by flecnodes and loops.

The relationship of the magnitude of this profile of the paths of the cutting edges of the cutterhead to the relationship of the axis of rotation of the cutterhead and the stationary blade of the mower is to be especially noticed. The distance between two of these opposed flecnodes is greater than twice the distance between the axis of rotation of the cutterhead and the stationary blade of the mower. The relative position of the stationary blade with reference to this profile of the paths of the cutting edges of the revolving blades is indicated by the line 27 in Figure 5.

As distinguished from the profile of the paths of the cutting edges of the revolving knives, the paths of the cutting edges of these knives is represented in Figure 9 in relationship to a typical cutter-head knife and the stationary knife of the mower. It will be observed that the ovoidal surfaces thus composed intersect with each other, in the illustration, along lines connecting the flecnodes of the profile and extend inwardly to circles whose diameters are less than twice the distance of separation of the axis of the cutterhead and the stationary cutting edge.

Characteristics of construction of the mower parts with particular reference to the dynamic properties thereof are as follows:

Those portions of the cutter-head blades which must be deflected upon contact with the stationary knife are of extremely small mass owing to the slight thickness of the blades. These blades are flexible and, when the cutter-head is in rapid rotation, may not transmit the full force of shocks between the more nearly rigid portions of the cutter-head and the stationary blade.

All portions of the mower may be considered to be strained when the machine is in operation, and, because of the intermittent nature of the various impacts incident to the shearing of the fibres between a rapidly revolving knife and a stationary knife, vibrations are set up in the several parts of frequencies depending upon their respective masses and the forces provided to constrain them to their respective desired relative positions. The relationship upon which the efficacy of a lawn mower of this character depends in great measure is that of contact between the revolving and stationary knives. Since the speed of rotation of the cutterhead under practicable operating condition varies widely the synchronizing of the vibrations of the cutter-head and of the stationary knife may not be provided for. Neither may the parts be made more nearly rigid, and thus of more nearly fixed relationship, by increasing the strength of the parts involved, as the lawn mower is essentially a portable tool and increased dimensions would involve increase weights beyond those practicable to employ. But in the mower of my invention synchronism of vibration of the cutting edges of the revolving blades and the stationary blade when in contact is effected in this wise:

The stationary blade is considered to be the element with whose frequency of vibration the vibrations of the revolving blades must be synchronized. This is accomplished by providing a great force constraining the revolving cutting edges to contact with the stationary blade, and a relatively slight mass of the parts so constrained to contact with and in synchronous vibration with the stationary blade. The special means affording these properties are the spring steel blades used in the cutter-head.

It will be obvious that by this means a celerity of centripetal movement of the cutting edges of the revolving blades is provided for which exceeds the aggregate velocities of probable movements in opposite directions of both the stationary knife and the more nearly rigid portions of the cutterhead. Hence, since both the stationary knife and the shaft of the cutterhead are capable only of relatively sluggish vibrations, shearing contacts between the revolving and stationary knives are insured.

A further effect accrues out of this combination of parts which effectually dampens and inhibits cumulatively regenerating vibrations constantly set up when the mower is in use. Dissimilar rates of vibration of the knife carriers and the stationary knife involve the frictional resistance imposed by the sliding contact of the flexible blades with the horizontal knife necessarily contemplated and incident to such vibrations since a flexure of each blade is involved in its passage over the stationary knife, and any change in the relationship between the cutterhead knife support and the stationary knife entails an increment or decrement of velocity of the cutterhead, or revolving cutting edge in its passage over the stationary blade in virtue of the resolution of the forces consequent in these conditions.

Another dynamic aspect of this combination of elements accruing out of the use of flat, flexible, revolving blades affording a valuable effect, is the varying pressure of contact between the flexible blades and the stationary knife. In Figure 1 it will be apparent that the distance between the first contacting portion of the revolving cutting edge and the axis of rotation is diminished by flexure of the blade, while the distance between the last contacting portion of that same blade and the axis of rotation is increased by flexure of the blade. Thus, the pressure of contact of each knife gradually increases as it passes over the stationary knife. The extent of this increment of pressure is commensurate with the driving force applied to the blade through the carrier arm to which it is secured.

Still another important dynamic aspect of such a cutterhead which contributes to the durability of the usual internal cog-wheel driving gear for the cutterhead, accrues from the use of flexible revolving blades which form the means for transmitting the energy required to carry the efficient load of the machine from the carrier arms to the shearing edges of these blades. Any form of cutterhead not employed continuously and uniformly in the work, but intermittently as the work is engaged, must be considered to be constantly accelerated and retarded. Since the strains involved in the gearing are inversely proportional to the distance through which such accelerating or retarding loads act, recognized that the great degree of flexibility of the revolving blades provides for the action of the kinetic energy of the moving parts through a greater distance and hence at a minimum of force. The gearing and other parts are thus protected from destructive forces, or shocks, acting and reacting between the heavy parts of the mower in uniform motion and the irregular resistances encountered.

The form of the knife carriers characterized by the angularly separated nog and notch, and alternately inclined surfaces to which the flexible knives are secured, perform a secondary function of considerable value. The hubs of these carriers, being in compression, between the nut 7 and annular projection 5, contribute to the stiffness of the shaft 4.

Figure 6:
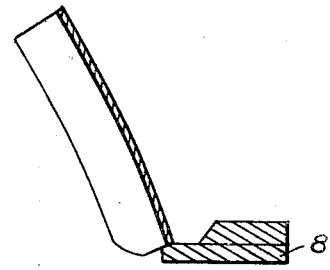
Figure 6 is a diagram representing a transverse section of both revolving and stationary knives illustrative of the relationship thereof in the usual shearing attitude.
Figure 7:
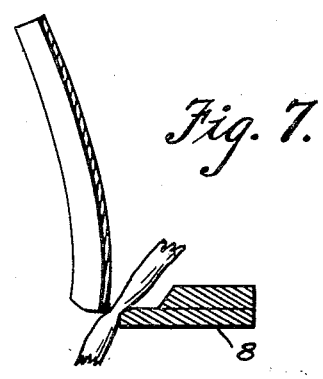
Figure 7 is a diagram representative of a transverse section of both revolving and stationary knives illustrative of the relationship thereof in the unusual or occasional attitude.

The operation of this mower is distinguishable by several unique characteristics. In shearing ordinary grasses the flexible cutterhead blades pass over the stationary knife in much the same manner as though none were being cut; wearing the blades away according to the attitude of the flexible blade with respect to the stationary knife as illustrated in Figure 6. But on encountering unusually tenacious fibres the flexible blade will be bent out of contact with the stationary blade and the fibre will have a tendency to slip between the shearing edges across the stationary blade; the attitude of the flexible blade in this circumstance being illustrated in Figure 7. But, however, the pressure exerted by the flexible blade increases gradually in virtue of the driving force of the cutter-head and the bearing upon the fibres of progressive portions of the cutting edge. This increased pressure cooperates with the imposition upon the fibres of the seldom used sharp edge brought into bearing by the unusual flexure of the blade to effect a final shearing of the fibres. Indeed the carrier arm and that part of the flexible blade latterly passing over the stationary blade constitute the equivalent of a toggle to compress and shear the obstinate fibres against the upper surface of the stationary blade.

It will be evident that the proportions and relative sizes of the flexible blades, the rigidity of the stationary knife, or truth of rotation of the cutter-head about its axis or as related to the stationary blade, are not critical requirements of this mower, and, on this account, a mower of unique efficacy and durability is provided.

Having described my invention what I claim is:

1. In lawn mowers, the combination with a stationary blade of a cutterhead comprising, a shaft upon which are mounted a series of knife carriers fitted with flat flexible blades disposed in planes inclined to the axis of rotation wherein the said flexible blades are formed with cutting edges disposed at a greater distance from the axis of rotation than the said stationary knife with which they make contact.

2. In lawn mowers, the combination with a stationary blade of a cutter-head comprising, a shaft upon which are mounted a series of knife carriers fitted with flat flexible blades disposed in planes inclined to the axis rotation wherein the said flexible blades are formed with cutting edges the profile of whose path is a series of flecnodes and loops situated at a greater distance from the axis of rotation than the said stationary knife.

3. In lawn mower cutter-heads, a shaft provided with an annular projection and a clamping nut, and a series of knife carriers mounted upon the said shaft and secured thereto between the said annular projection and clamping nut, wherein the said knife carrier hubs are formed with a nog at one end and a notch angularly separated therefrom at the other end adapted to engage the said nog of an adjacent knife carrier.

4. In lawn mowers, the combination with a stationary blade of a cutter-head comprising, a shaft upon which are mounted a series of knife carriers formed with radial arms and hubs at opposite ends of which and angularly separated from each other are a nog and notch respectively, and flexible knives secured to the arms of said knife carriers parallel with planes inclined to the axis of rotation wherein the said flexible blades are formed with cutting edges the profile of whose paths is a series of flecnodes and loops situated at a greater distance from the axis of rotation than the said stationary knife.

CHESTER A. GRATIOT.